(12) United States Patent
Negishi et al.

(10) Patent No.: US 10,531,136 B2
(45) Date of Patent: Jan. 7, 2020

(54) DATA PROCESSING DEVICE, DATA PROCESSING METHOD, AND PROGRAM

(71) Applicant: Sony Corporation, Tokyo (JP)

(72) Inventors: Shinji Negishi, Kanagawa (JP); Kazuhiro Ishigaya, Kanagawa (JP); Michito Ishii, Tokyo (JP); Takehito Watanabe, Tokyo (JP); Noriaki Ooishi, Kanagawa (JP); Yasuyuki Chaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 13 days.

(21) Appl. No.: 15/573,225

(22) PCT Filed: Jun. 10, 2016

(86) PCT No.: PCT/JP2016/067323
§ 371 (c)(1),
(2) Date: Nov. 10, 2017

(87) PCT Pub. No.: WO2016/208417
PCT Pub. Date: Dec. 29, 2016

(65) Prior Publication Data
US 2018/0139474 A1    May 17, 2018

(30) Foreign Application Priority Data
Jun. 26, 2015 (JP) ................................. 2015-128880

(51) Int. Cl.
*H04N 21/236* (2011.01)
*H04N 21/6332* (2011.01)

(52) U.S. Cl.
CPC ....... *H04N 21/236* (2013.01); *H04N 21/6332* (2013.01)

(58) Field of Classification Search
CPC ............. H04N 21/236; H04N 21/2368; H04N 21/2365; H04N 21/242; H04N 21/4307; H04N 21/8456; H04N 21/8547
See application file for complete search history.

(56) References Cited

U.S. PATENT DOCUMENTS

| | | | |
|---|---|---|---|
| 2015/0062353 A1* | 3/2015 | Dalal ................. | G11B 27/3036 348/194 |
| 2015/0195588 A1* | 7/2015 | Park ................. | H04N 21/23605 725/96 |
| 2015/0373380 A1* | 12/2015 | Tsukagoshi ........ | H04N 21/2362 725/109 |

FOREIGN PATENT DOCUMENTS

JP            5672407 B2      1/2015

OTHER PUBLICATIONS

T. Nakachi, et al., "A Conceptual Foundation of NSCW Transport Design Using an MMT Standard," 2013 IEEE, pp. 1-9, Japan.
(Continued)

*Primary Examiner* — Mohamed A Kamara
(74) *Attorney, Agent, or Firm* — Michael Best & Friedrich LLP

(57) ABSTRACT

A device, method, and program for data stream reproduction are disclosed. In one example, a transmission device includes a multiplexer that generates a data stream by multiplexing a data packet and a control information packet separately from each other, the data packet being a packet including reproduction data as the current data to be reproduced, the control information packet being a packet including control information to be used in reproducing the reproduction data. The multiplexer multiplexes a first packet in a position behind the position located a predetermined first number of packets before a second packet among multiplexing-enabled positions in which the control information packet can be multiplexed in the data stream, the first
(Continued)

packet being the control information packet including the control information corresponding to a predetermined processing unit of the reproduction data, the second packet being the data packet including the processing unit.

20 Claims, 13 Drawing Sheets

(56) References Cited

OTHER PUBLICATIONS

"MMT-Based Media Transport Scheme in Digital Broadcasting Systems," ARIB STD-B60 version 1.2, [online], Mar. 17, 2015, pp. 1-36.
H. Honma, et al., "A Study on Re-Multiplexing Method of Transport Stream," Proceedings of the 1997 IEICE General Conference, Mar. 24-27, 1997, pp. 1-4, Japan.

* cited by examiner

DATA PROCESSING DEVICE, DATA PROCESSING METHOD, AND PROGRAM

TECHNICAL FIELD

The present technology relates to data processing devices, data processing methods, and programs, and more particularly, to a data processing device, a data processing method, and a program that enable appropriate reproduction of a data stream generated by packetizing and multiplexing the current data to be reproduced, separately from the control information to be used in reproducing the data.

BACKGROUND ART

MPEG-2 Transport Stream (TS) specified in ISO 13818-1, for example, is used as a conventional digital broadcast data structure. In an MPEG-2 TS, time information including a decoding time and a presentation time for each unit such as each picture of a video signal or each frame of an audio signal is encoded in the header of a packet of a video signal and an audio signal. Accordingly, the time information and the top of the data corresponding to the time information are located close to each other in the data stream, and can be easily associated with each other.

On the other hand, in ARIB-STD-B60, which is a standard using MPEG Media Transport (MMT) specified in Part 1 in the MPEG-H standards, for example, a video signal and an audio signal are packetized separately from the time information corresponding to these signals by a method using an MMT message as disclosed in Patent Document 1. Furthermore, a packet including the data of the video signal and the audio signal (this packet will be hereinafter referred to as the data packet), and a packet including control information such as time information (this packet will be hereinafter referred to as the control information packet) are multiplexed into a data stream separately from each other, and are then transmitted.

CITATION LIST

Patent Document

Patent Document 1: JP 5672407 B1

SUMMARY OF THE INVENTION

Problems to be Solved by the Invention

However, in a case where the control information packet is transmitted much earlier than the corresponding data packet, the reception device is highly likely to receive the data stream, starting from between the control information packet and the corresponding data packet. Furthermore, in a case where the reception device receives the data stream starting from between the control information packet and the corresponding data packet, the time information to be used in reproducing the data included in the received data packet cannot be obtained. Therefore, the reception device might not be able to appropriately present the video image and the sound corresponding to the data included in the received data packet.

Further, in a case where the reception device records the received data stream and then reproduces the data stream, the interval between the control information packet and the data packet is long in the recorded data stream. Therefore, in a case where the reception device reproduces a recorded data stream, the reception device needs to discard the packets during the period from the start of reading of the control information packet corresponding to the data packet to be reproduced, till the corresponding data packet. As a result, the start of presentation of the video image and the sound might be delayed.

Therefore, the present technology aims to enable appropriate reproduction of a data stream generated by packetizing and multiplexing the current data to be reproduced, separately from the control information to be used in reproducing the data.

Solutions to Problems

A data processing device according to one aspect of the present technology includes a multiplexer that generates a first data stream by multiplexing a data packet and a control information packet separately from each other, the data packet being a packet including reproduction data as the current data to be reproduced, the control information packet being a packet including control information to be used in reproducing the reproduction data. The multiplexer multiplexes a first packet in a position behind the position located a predetermined first number of packets before a second packet among multiplexing-enabled positions in which the control information packet can be multiplexed in the first data stream, the first packet being the control information packet including the control information corresponding to a predetermined processing unit of the reproduction data, the second packet being the data packet including the processing unit.

The multiplexer may multiplex the first packet in a position closest to the second packet among the multiplexing-enabled positions, the position closest to the second packet being located before the second packet.

A transmission unit that transmits the first data stream may be further provided. In a case where the first packet is to be multiplexed after the second packet, the multiplexer may multiplex the first packet in a position where the device that receives the first data stream can receive the first packet before the timing to start reproducing the reproduction data included in the second packet.

A data packet generation unit that generates the data packet, and a control information packet generation unit that generates the control information packet may be further provided. The multiplexer may multiplex the data packet generated by the data packet generation unit and the control information packet generated by the control information packet generation unit.

A separator that separates the data packet and the control information packet from a second data stream may be further provided. The multiplexer may generate the first data stream by re-multiplexing the separated data packet and control information packet.

A recording control unit that controls recording of the first data stream on a recording medium may be further provided. In a case where the first packet is to be multiplexed after the second packet, the multiplexer may multiplex the first packet in a position before the position located a predetermined second number of packets behind the second packet, among the multiplexing-enabled positions.

The multiplexer may multiplex the first packet in a position closest to the second packet among the multiplexing-enabled positions, the position closest to the second packet being located behind the second packet.

A separator that separates the data packet and the control information packet from a second data stream may be further provided. The multiplexer may generate the first data stream by re-multiplexing the separated data packet and control information packet.

The second packet may include at least one of a reproduction starting point at which reproduction can be started in the processing unit, and the top of the processing unit.

The reproduction data may be a video signal, and the reproduction starting point may be a random access point.

The control information may include timing information to be used in controlling the timing to reproduce the reproduction starting point of the processing unit.

The timing information may include at least one of a piece of information indicating the time to start decoding of the reproduction starting point, and a piece of information indicating the time to present the reproduction starting point.

The data packet and the control information packet may be Protocol (MMP) Packets, and the processing unit may be a Media Processing Unit (MPU).

A data processing method according to one aspect of the present technology is implemented in a data processing device that generates a data stream by multiplexing a data packet and a control information packet separately from each other, the data packet being a packet including reproduction data as the current data to be reproduced, the control information packet being a packet including control information to be used in reproducing the reproduction data. The data processing method includes a multiplexing step of multiplexing a first packet in a position behind the position located a predetermined first number of packets before a second packet among multiplexing-enabled positions in which the control information packet can be multiplexed in the data stream, the first packet being the control information packet including the control information corresponding to a predetermined processing unit of the reproduction data, the second packet being the data packet including the processing unit, the multiplexing step being carried out by the data processing device.

A program according to one aspect of the present technology is executed in a computer that generates a data stream by multiplexing a data packet and a control information packet separately from each other, the data packet being a packet including reproduction data as the current data to be reproduced, the control information packet being a packet including control information to be used in reproducing the reproduction data. The program causes the computer to perform a process including a multiplexing step of multiplexing a first packet in a position behind the position located a predetermined first number of packets before a second packet among multiplexing-enabled positions in which the control information packet can be multiplexed in the data stream, the first packet being the control information packet including the control information corresponding to a predetermined processing unit of the reproduction data, the second packet being the data packet including the processing unit.

In one aspect of the present technology, a data stream is generated by multiplexing a data packet and a control information packet separately from each other, the data packet being a packet including reproduction data as the current data to be reproduced, the control information packet being a packet including control information to be used in reproducing the reproduction data. Also, a first packet that is the control information packet including the control information corresponding to a predetermined processing unit of the reproduction data is multiplexed in a position behind the position located a predetermined first number of packets before a second packet that is the data packet including the processing unit, among multiplexing-enabled positions in which the control information packet can be multiplexed in the data stream.

Effects of the Invention

According to one aspect of the present technology, at is possible to appropriately reproduce a data stream generated by packetizing and multiplexing the current data to be reproduced, separately from the control information to be used in reproducing the data.

It should be noted that the advantageous effects described in this specification are merely examples, and the advantageous effects of the present technology are not limited to them and may include some additional effects.

MODES FOR CARRYING OUT THE INVENTION

The following is a description of modes (hereinafter referred to as embodiments) for carrying out the present technology. It should be noted that explanation will be made in the following order.

1. First embodiment (an example applied to a transmission device)

2. Second embodiment (an example applied to a recording device)

3. Third embodiment (an example applied to a retransmission device)

4. Modifications

1. First Embodiment

Referring to FIGS. 1 through 7, a first embodiment of the present technology is first described.

[Example Configuration of a Transmission Device 101]

Figure 1:
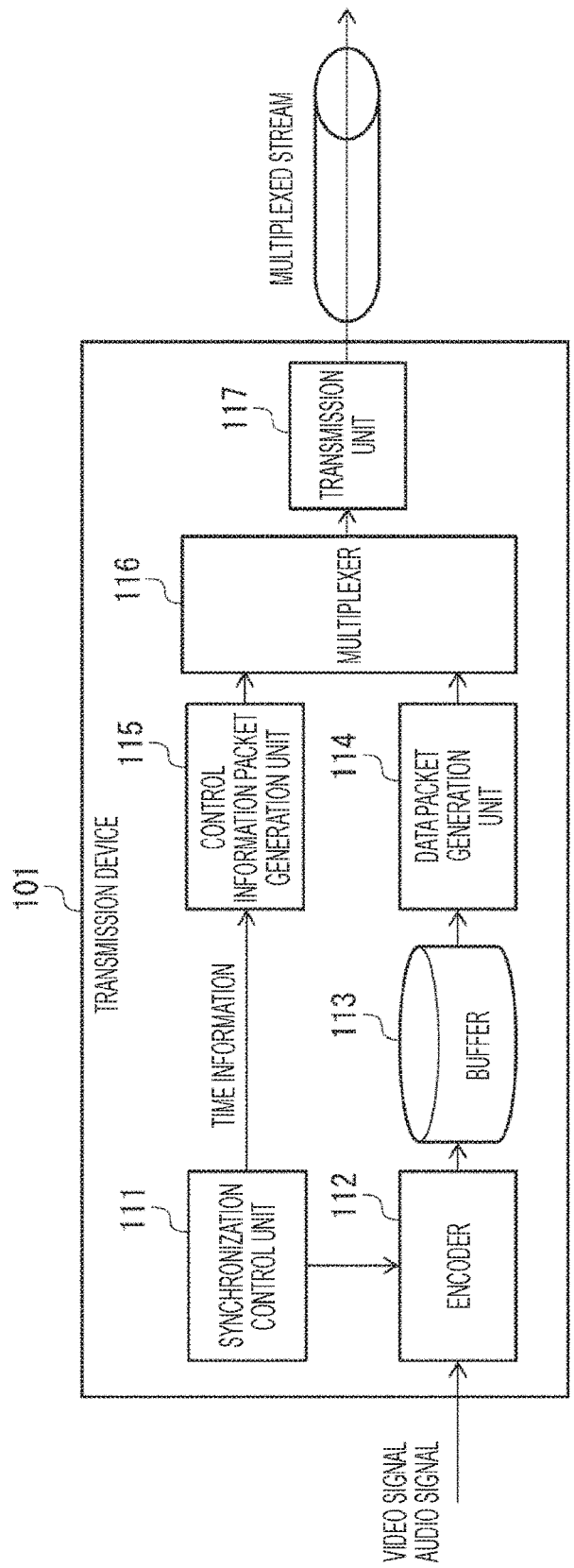
FIG. 1 is a block diagram showing an embodiment of a transmission device to which the present technology is applied.

FIG. 1 is a block diagram showing an embodiment of a transmission device 101 to which the present technology is applied.

The transmission device 101 is a device that transmits data such as video signals and audio signals by a media transport method compliant with MMT, for example. It should be noted that, in the description below, a case where the transmission device 101 transmits video signals and audio signals is described.

The transmission device 101 includes a synchronization control unit 111, an encoder 112, a buffer 113, a data packet generation unit 114, a control information packet generation unit 115, a multiplexer 116, and a transmission unit 117.

The synchronization control unit 111 controls operation of the encoder 112. The synchronization control unit 111 also generates time information to be used in reproducing data encoded by the encoder 112, and supplies the time information to the control information packet generation unit 115.

The time information generated by the synchronization control unit 111 includes a decoding time and a presentation time, for example.

The decoding time indicates a time at which data decoding is started in the reception device that receives a data stream transmitted from the transmission device 101, for example. An example of the decoding time indicates a time at which decoding of each picture of a video signal or each frame of an audio signal is started. It should be noted that a reception device does not need to start decoding at the decoding time, and may start decoding before the decoding time.

The presentation time indicates a time at which data presentation is started in the reception device. For example, the presentation time indicates a time at which an image corresponding to each picture of a video signal is displayed, or sound corresponding to each frame of an audio signal is output.

It should be noted that the decoding time and the presentation time may be expressed by absolute times, or may be expressed by times relative to a predetermined base time, for example.

The encoder 112 encodes video signals and audio signals that are input from outside. The encoder 112 stores the encoded video signals and audio signals into the buffer 113.

The data packet generation unit 114 generates MMT Protocol (MMTP) Packets by packetizing the video signals and the audio signals stored in the buffer 113 (the MMTP Packets will be hereinafter referred to as data packets). The data packet generation unit 114 supplies the generated data packets to the multiplexer 116.

The control information packet generation unit 115 generates MMTP Packets by packetizing the control information to be used in reproducing the video signals and the audio signals included in the data packets (the MMTP Packets will be hereinafter referred to as control information packets). The control information included in the control information packets includes the time information generated by the synchronization control unit 111. The control information packet generation unit 115 supplies the generated control information packets to the multiplexer 116.

The multiplexer 116 generates a data stream by multiplexing the data packets and the control information packets separately from each other (this data stream will be hereinafter referred to as the multiplexed stream), and supplies the multiplexed stream to the transmission unit 117.

The transmission unit 11 performs transmission of the multiplexed stream generated by the multiplexer 116.

[Example Data Structure of an MMTP Packet]

Figure 2:
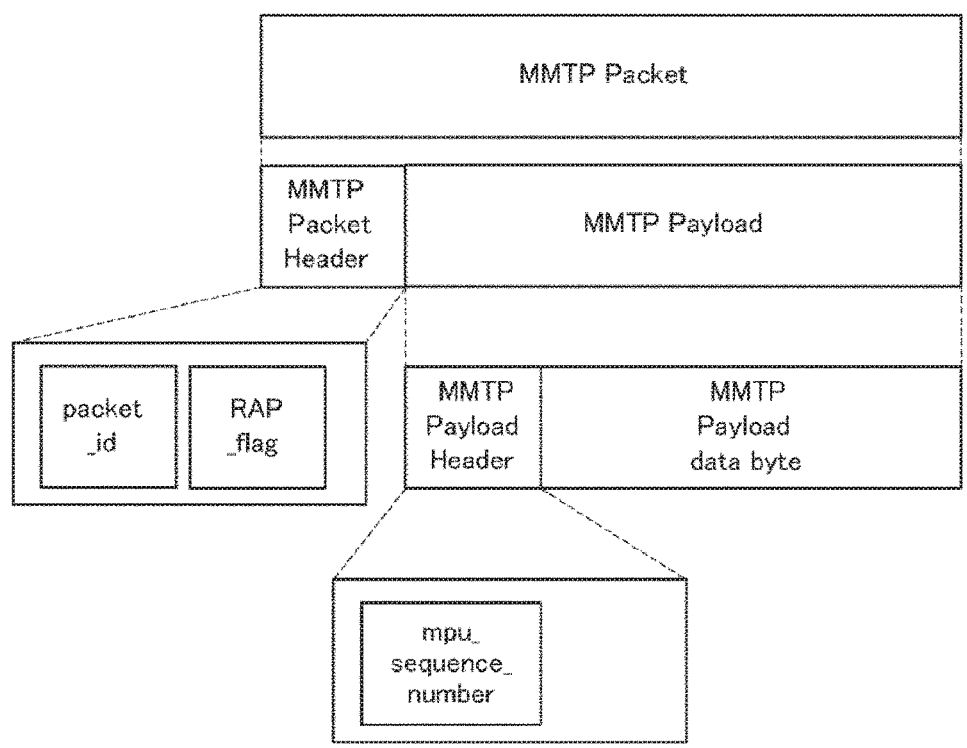
FIG. 2 is a diagram showing an example data structure of an MMTP Packet.

FIG. 2 shows an example data structure of an MMTP Packet that forms a data packet or a control information packet.

An MMTP Packet includes an MMTP Packet Header and an MMTP Payload.

The MMTP Packet Header includes a "packet_id" and a "RAP_flag".

The "packet_id" is the identifier for identifying the type of the data included in the MMTP Payload data byte of the MMTP Payload. For example, different "packet_ids" are assigned to the respective video signals and the respective audio signals multiplexed into a multiplexed stream. Different "packet_ids" are also assigned to a data packet and a control information packet.

The "RAP_flag" is the flag for determining whether a random access point is included in the data included in the MMTP Payload data byte of the MMTP Payload. A random access point is a point where random access can be made, and is equivalent to a picture in which random access can be made in a video signal.

The MMTP Payload includes an MMTP Payload Header and an MMTP Payload data byte.

The MMTP Payload Header includes an "mpu_sequence_number" only in the case of a data packet. The "mpu_sequence_number" is a sequence_number assigned to the processing unit, called Media Processing Unit (MPU) to which the data included in the MMTP Payload data byte belongs. Different "mpu_sequence_numbers" are assigned to the data with different "packet_ids". In a case where a video signal 1 with a "packet_id" of ID1 and a video signal 2 with a "packet_id" of ID2 are multiplexed into a multiplexed stream, for example, "mpu_sequence_numbers" are sequentially assigned starting from the first MPU of the video signal 1, and likewise, "mpu_sequence_numbers" are sequentially assigned starting from the first MPU of the video signal 2. Accordingly, each MPU of each video signal and each audio signal can be identified by a combination of a "packet_id" and an "mpu_sequence_number".

In the case of a video signal, for example, an MPU is set between random access points. For example, pictures from a picture as a random access point to the picture immediately before the next random access point are allocated to one MPU. More specifically, one Group of Pictures (GOP) is allocated to one MPU, for example.

It should be noted that the top of an MPU is not necessarily a random access point. Alternatively, one MPG may include more than one random access point. Further, not all the MPUs need to include a random access point, and there may be one or more MPUs that do not include a random access point.

It should be noted that, in the description below, a case where each MPU includes a random access point and the top of each MPU is a random access point is described, for ease of explanation.

The MMTP Payload data byte is an area that includes actual data. For example, the MMTP Payload data byte includes video signals and audio signals in the case of a data packet, and includes control information in the case of a control information packet.

It should be noted that one MPU can be stored in one data packet, but one MPU may also be divided and stored in different data packets. In the latter case, the pictures included in one MPU are divided and stored in different data packets.

It should be noted that, in the description below, a case where each one MPU is stored in one data packet is described, for ease of explanation.

[Example Data Structure of a Control Information Packet]

Figure 3:
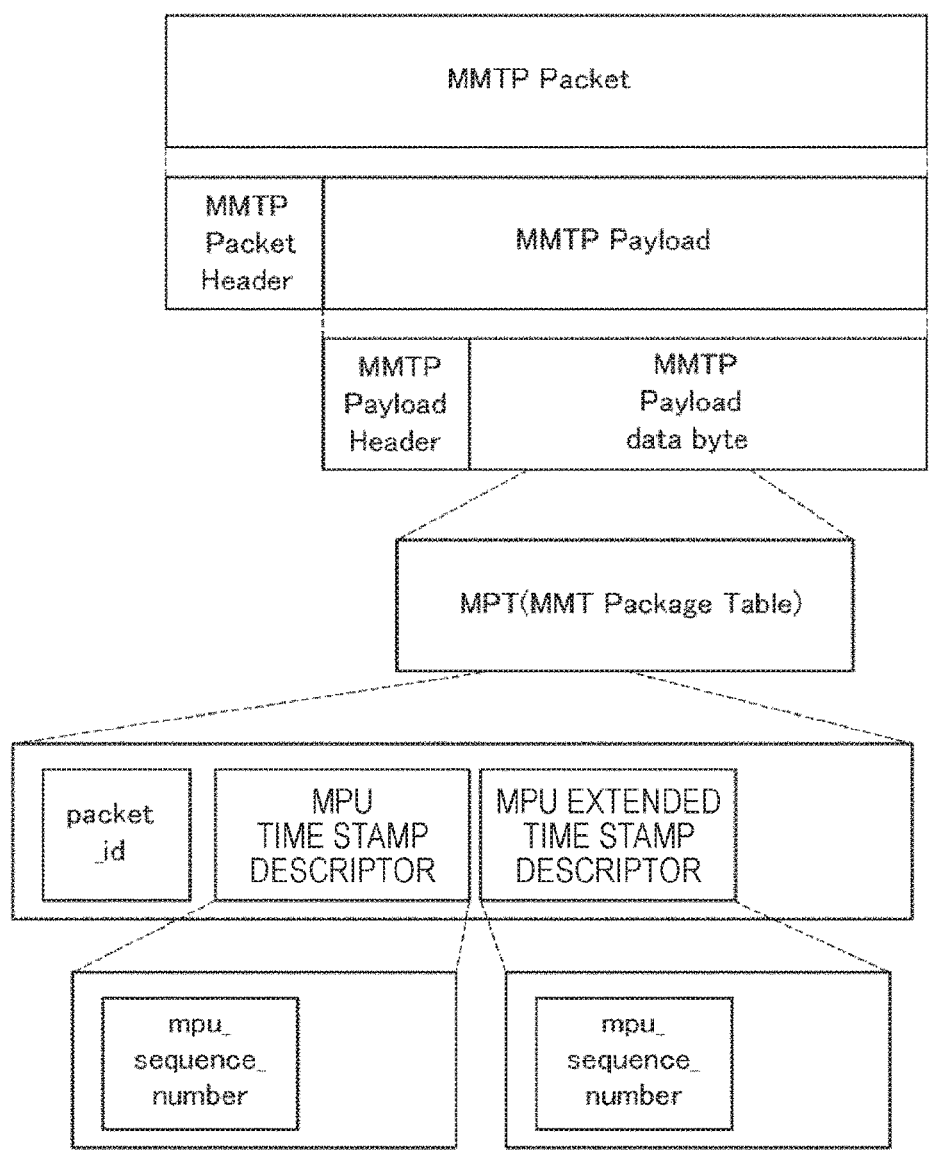
FIG. 3 is a diagram showing an example data structure of a control information packet.

FIG. 3 shows an example data structure of a control information packet.

Various data tables and the like are stored, as necessary, in the MMT Payload data byte of a control information packet. Furthermore, one of the data tables stored in the MMTP Payload data byte is an MMT Package Table (MPT). The MPT includes the "packet_id" of the current data (a video signal or an audio signal) that is subject to the control information included in the control information packet, an MPU time stamp descriptor, an MPU extended tame stamp descriptor, and the like.

The MPU time stamp descriptor and the MPU extended time stamp descriptor include the time information about the current MPU that is subject to the control information included in the control information packet. In the case of a video signal, for example, the MPU time stamp descriptor and the MPU extended time stamp descriptor include the decoding time and the presentation time of each picture included in the current MPU that is subject to the control information included in the control information packet. Also, the MPU time stamp descriptor and the MPU extended time stamp descriptor each include the "mpu_sequence_number" of the current MPU that is subject to the control information included in the control information packet.

It should be noted that the time information about one MPU may be stored in one control information packet, or the time information about one MPU may be divided and stored in different control information packets. In the latter case, the time information about each of the pictures included in one MPU is divided and stored in different data packets.

It should be noted that, in the description below, a case where the time information about each one MPU is stored in one control information packet is described, for ease of explanation.

[Method of Associating Data Packets with Control Information Packets]

Figure 4:
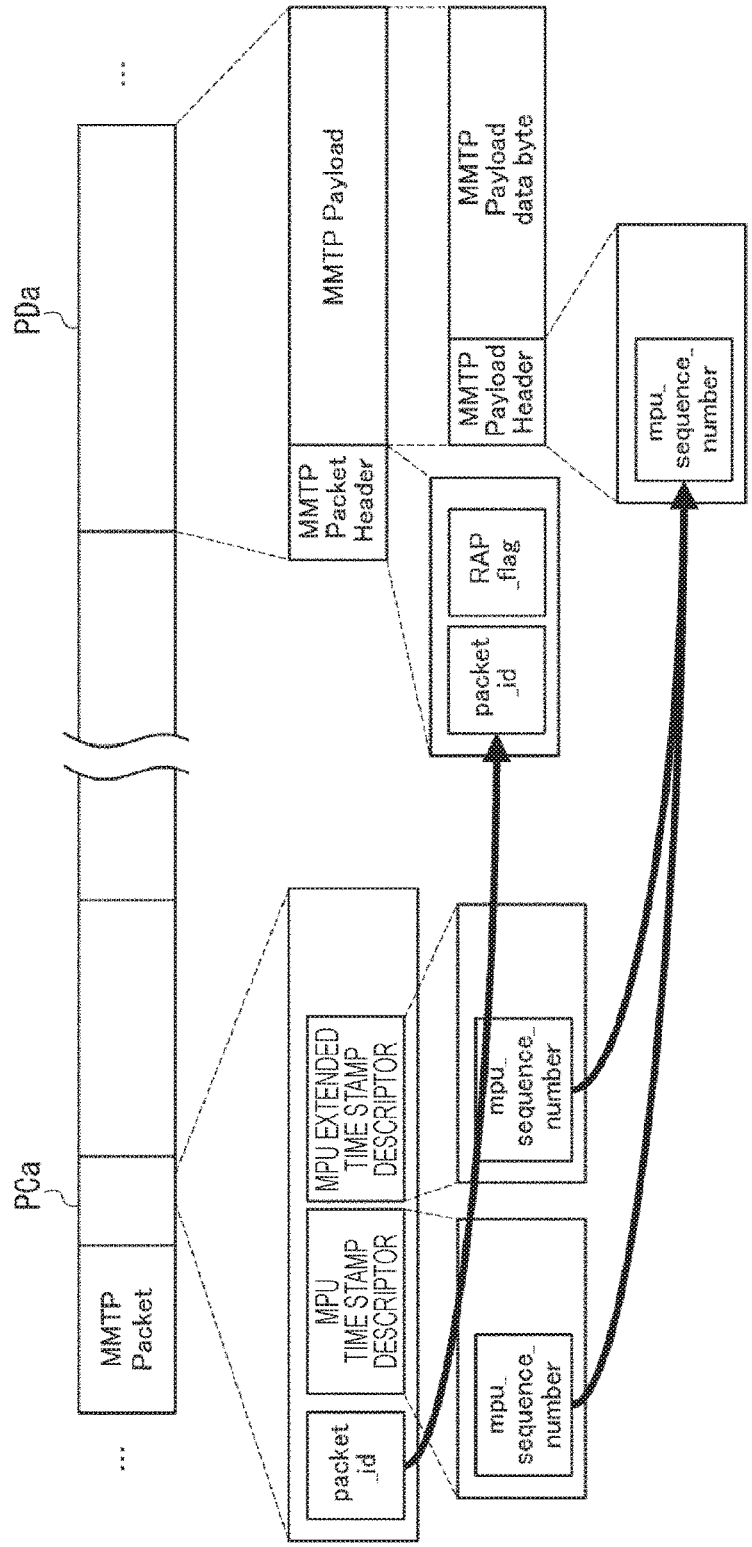
FIG. 4 is a diagram for explaining a method of associating a data packet with a control information packet.

Referring now to FIG. 4, a method of associating data packets with control information packets is described. This drawing shows the positions of a control information packet PCa and a data packet PDa that are multiplexed into a multiplexed stream.

A check can be made to determine whether the control information packet PCa and the data packet PDa in FIG. 4 are packets that correspond to each other, in accordance with the "packet_ids" and the "mpu_sequence_numbers". Specifically, the control information packet PCa and the data packet PDa are packets that correspond to each other, in a case where the "packet_id" of the MPT of the control information packet PCa matches the "packet_id" of the MMTP Packet Header of the data packet PDa, and the "mpu_sequence_numbers" of the MPU time stamp descriptor and the MPU extended time stamp descriptor of the control information packet PCa match the "mpu_sequence_number" of the MMTP Payload Header of the data packet PDa. That is, the time information and the like about the data included in the MMTP Payload data byte of the data packet PDa are included in the control information packet PCa. In a case where the "packet_ids" or the "mpu_sequence_numbers" do not match, on the other hand, the control information packet PCa and the data packet PDa are not packets that correspond to each other. That is, the time information and the like about the data included in the MMTP Payload data byte of the data packet PDa are not included in the control information packet PCa.

In the description below, a case where the control information packet PCa and the data packet PDa are packets that correspond to each other is described.

As shown in FIG. 4, in a case where the positions of the control information packet PCa and the data packet PDa are separated in the multiplexed stream, or where there is a difference in the time of transmission between the control information packet PCa and the data packet PDa, there a high possibility that the reception device receives the multiplexed stream, starting from between the control information packet PCa and the data packet PDa. Furthermore, in a case where the reception device receives the multiplexed stream starting from between the control information packet PCa and the data packet PDa, the reception device cannot receive the control information packet PCa, and therefore, cannot obtain the time information corresponding to the data (a video signal or an audio signal) included in the data packet PDa. As a result, the reception device might not be able to reproduce the data included in the data packet PDa, or might not be able to reproduce the data at the right timing.

Further, in a case where the reception device performs reproduction after recording the multiplexed stream shown in FIG. 4, the reception device needs to perform reading starting from the control information packet PCa when performing reproduction starting from the data included in the data packet PDa. Therefore, the reception device needs to discard unnecessarily read packets between the control information packet PCa and the data packet PDa, and a delay might be caused in reproduction of the data included in the data packet PDa.

[Multiplexing Process to be Performed by the Transmission Device 101]

Figure 5:
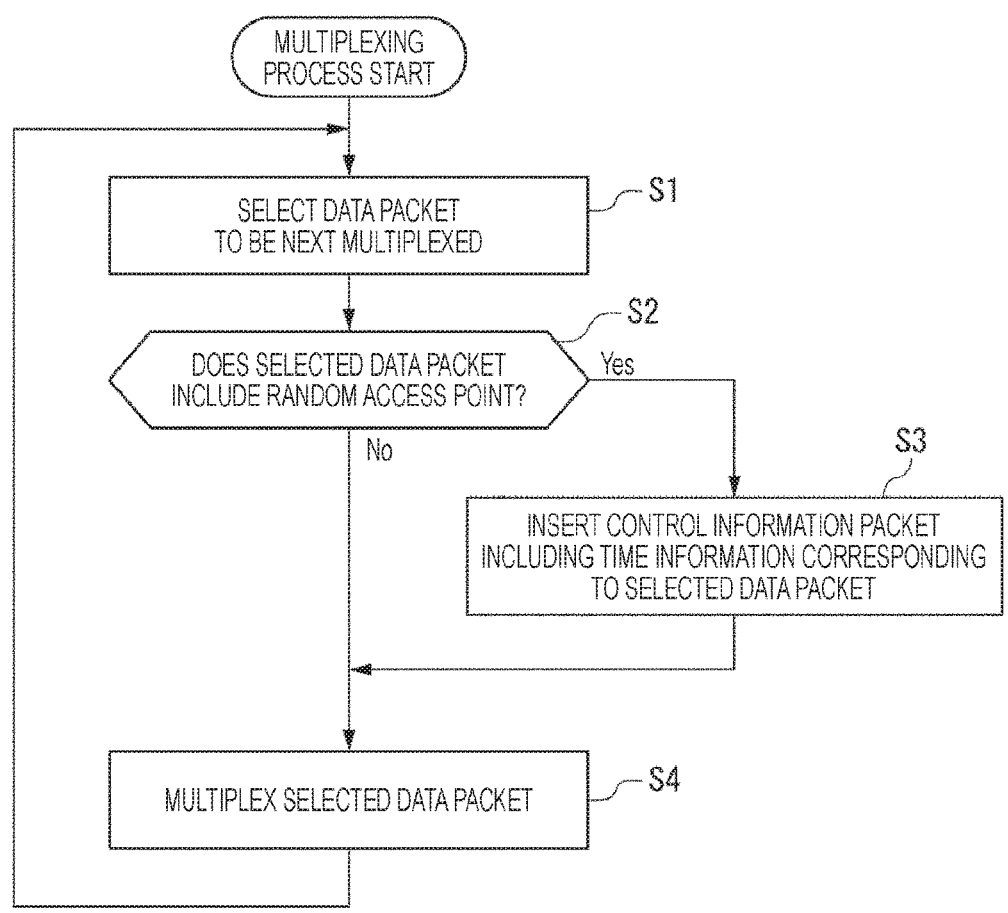
FIG. 5 is a flowchart for explaining a multiplexing process to be performed by the transmission device.

Referring now to the flowchart in FIG. 5, a multiplexing process to be performed by the transmission device 101 is described.

In step S1, the multiplexer 116 selects the data packet to be next multiplexed. Specifically, the multiplexer 116 selects the data packet to be next multiplexed into a multiplexed stream, from among the data packets supplied from the data packet generation unit 114.

In step S2, in accordance with the value of the "RAP_flag" of the selected data packet, the multiplexer 116 determines whether the selected data packet includes a random access point. In a case where the selected data packet is determined to include a random access point, the process moves on to step S3.

In step S3, the multiplexer 116 inserts the control information packet including the time information corresponding to the selected data packet. Specifically, the multiplexer 116 searches the control information packets supplied from the control information packet generation unit 115, for the control information packet in which the same "packet_id" and "mpu_sequence_number" as those of the selected data packet are set in the MPT.

The multiplexer 116 then supplies the detected control information packet to the transmission unit 117. The transmission unit 117 transmits the supplied control information packet. As a result, the control information packet including the time information corresponding to the selected data packet, or more specifically, the control information packet including the time information to be used in reproducing the data included in the selected data packet, is multiplexed into the multiplexed stream.

After that, the process moves on to step S4.

In a case where the selected data packet is determined not to include a random access point in step S2, on the other hand, the procedure in step S3 is skipped, and the process moves on to step S4.

In step S4, the multiplexer 116 multiplexes the selected data packet. That is, the multiplexer 116 supplies the selected data packet to the transmission unit 117. The transmission unit 117 transmits the supplied data packet. As a result, the selected data packet is multiplexed into the multiplexed stream.

After that, the process returns to step S1, and the procedures in step S1 and the later steps are carried out.

Figure 6:
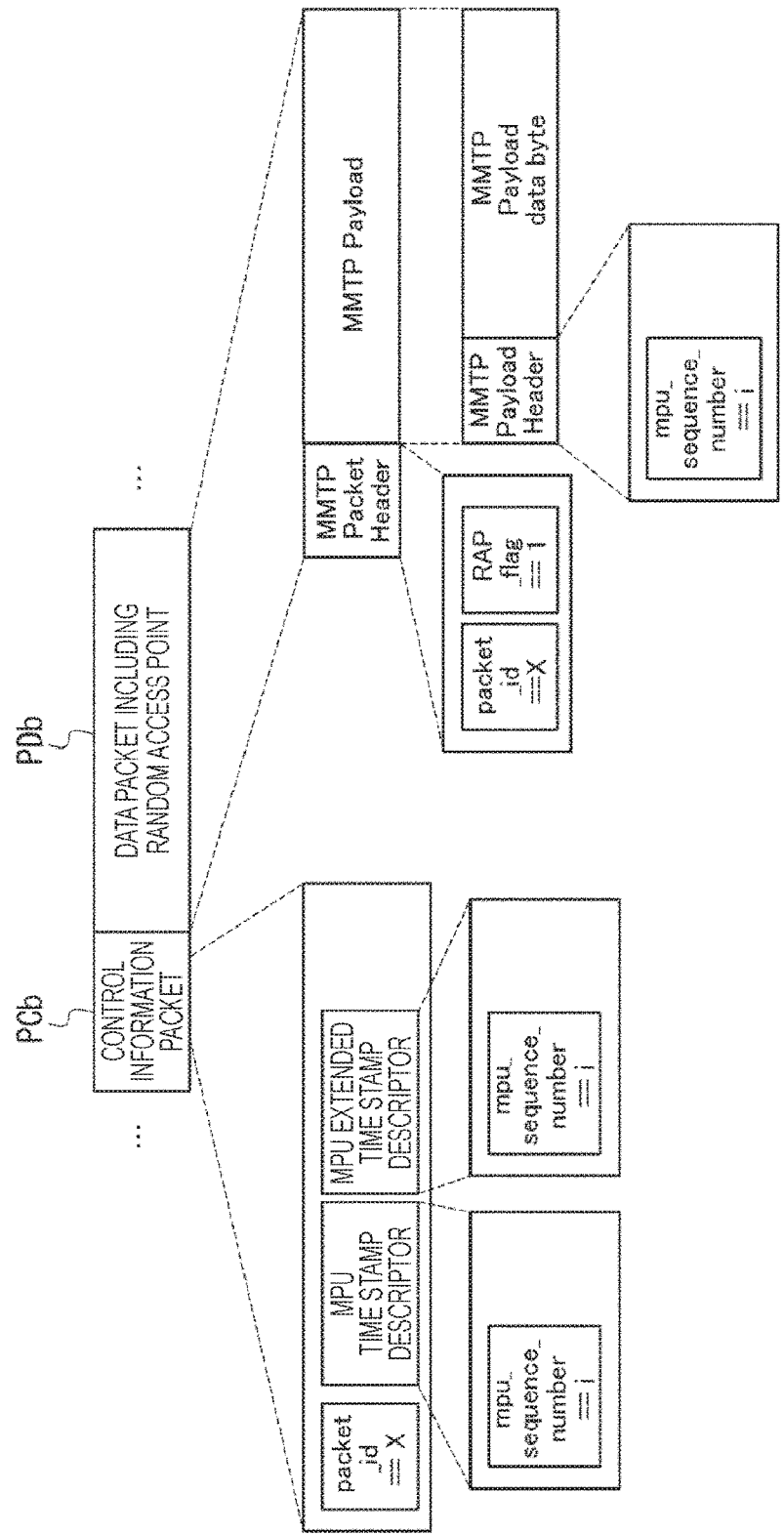
FIG. 6 is a diagram showing a first example of a position in which a control information packet is multiplexed.

Through the above process, the control information packet PCb including the time information corresponding to a data packet PDb the time information being the decoding time and the presentation time of the data included in the data packet PDb) is multiplexed immediately before the data packet PDb including a random access point, as shown in FIG. 6. The time information included in the control information packet PCb of course includes the time information corresponding to the random access point included in the data packet. PDb. As a result, the possibility that the reception device receives the multiplexed stream starting from between the data packet PDb and the control information packet PCb becomes lower, and the time information corresponding to the data in the data packet PDb can be obtained without fail.

As a result, the reception device becomes able to appropriately reproduce the data stream. For example, the reception device becomes able to reproduce the data included in the data packet PDb at the right timing, without taking any special measures. Specifically, the reception device becomes able to decode the video signal or the audio signal included in the data packet PDb in accordance with the decoding time included in the control information packet PCb, and present the decoded signal in accordance with the presentation time included in the control information packet PCb.

For example, in a case where the transmission device 101 performs transmission of broadcast signals in a multiplexed stream, the reception device can certainly receive the time information corresponding to the video signal and the audio signal immediately after application of power or switching of channels. The reception device can then promptly and appropriately present the video image based on the video signal and the sound based on the audio signal.

Further, in a case where the reception device records the data stream shown in FIG. 6 and then performs reproduction starting from the data included in the data packet PDb, for example, the reception device performs reading starting from the control information packet PCb immediately before the data, to obtain the time information to be used in reproducing the data. As a result, the reception device does not need to discard unnecessarily read packets between the control information packet PCb and the data packet PDb, and can promptly start reproduction of the data included in the data packet PDd.

It should be noted that, in a case where the transmission device 101 multiplexes data of more than one broadcast program, more than one video signal, or more than one audio signal, for example, a packet that is multiplexed for each broadcast program, for each video signal, or for each audio signal might be selected in the procedure in step S1. In this case, a packet of another broadcast program, another video signal, or another audio signal may be inserted between the control information packet PCb and the data packet. PDb in FIG. 6.

[Modifications of Positions in which a Control Information Packet is Multiplexed]

Next, modifications of positions in which a control information packet is multiplexed are described.

For example, the control information packet PCb is not necessarily multiplexed before the data packet PDb, and may be multiplexed after the data packet PDb. Here, the reception device should receive the control information packet PCb before the timing to start reproduction of the data included in the data packet PDb (this timing will be hereinafter referred to as the reproduction start timing Tp). Therefore, in a case where the multiplexer 116 multiplexes the control information packet PCb after the data packet PDb, the multiplexer 116 should multiplex the control information packet PCb in such a position that the reception device can receive the control information packet PCb before the reproduction start timing Tp.

Here, the reproduction start timing Tp can be regarded as the decoding time of the random access point at which decoding is first started in the data packet PDb, for example. Therefore, the multiplexer 116 should multiplex the control information packet PCb in such a position that the reception device can receive the control information packet PCb before the decoding time of the random access point in the data packet PDb. With the transmission time between the transmission device 101 and the reception device being taken into account, the multiplexer 116 should multiplex the control information packet PCb at least a predetermined time before the decoding time of the random access point, in the data packet PDb, for example, and then transmit the control information packet PCb.

It should be noted that, in a case where the data packet PDb includes more than one random access point, the multiplexer 116 should multiplex the control information packet PCb at least a predetermined time before the decoding time of the first random access point in the data packet PDb, for example, and then transmit the control information packet PCb.

Figure 7:
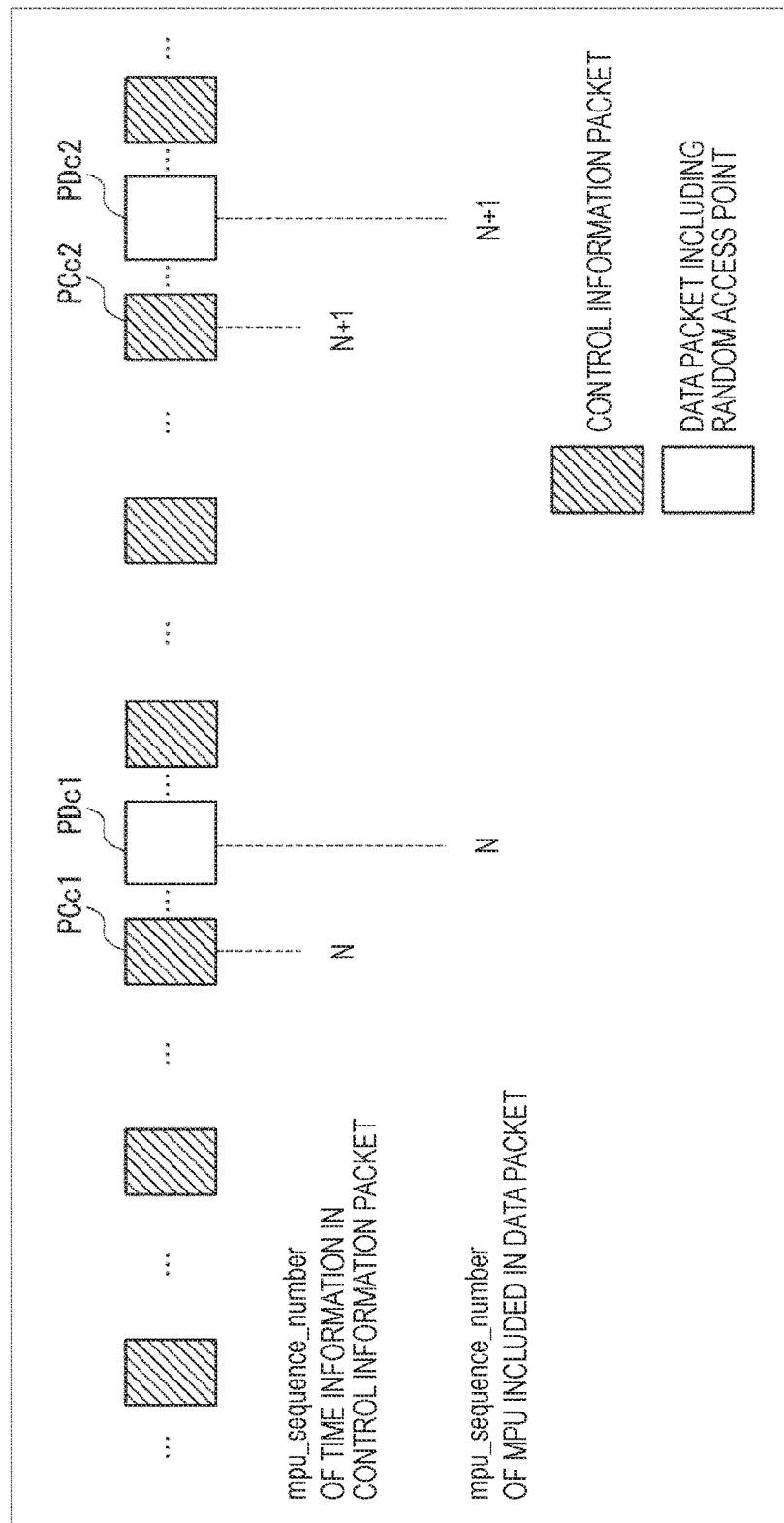
FIG. 7 is a diagram showing a second example of a position is which a control information packet is multiplexed.

Further, there are cases where a control information packet needs to be periodically multiplexed, for example, and the positions in which a control information packet can be multiplexed are determined in advance (these positions will be hereinafter referred to as the control information multiplexing points), as indicated by the shaded portions in FIG. 7. In this case, the multiplexer 116 cannot necessarily multiplex a control information packet PCc1 corresponding to a data packet PDc1 including a random access point, immediately before the data packet PDc1.

Therefore, in a case where the multiplexer 116 multiplexes the control information packet PCc1 before the data packet PDc1 in such a case, the multiplexer 116 should multiplex the control information packet PCc1 in the position closest to the data packet PDc1 among the control information multiplexing points. It should be noted that, in a case where there is a control information multiplexing point immediately before the data packet PDc1, the control information packet PCc1 is multiplexed immediately before the data packet PDc1, as in the example shown in FIG. 6.

Likewise, in a case where the multiplexer 116 multiplexes a control information packet PCc2 corresponding to a data packet PDc2 including a random access point before the data packet PDc2, the multiplexer 116 should multiplex the control information packet PCc2 in the position closest to the data packet PDc2 among the control information multiplexing points.

Further, in a case where the multiplexer 116 multiplexes the control information packet PCc1 before the data packet. PDc1, for example, the multiplexer 116 may multiplex the control information packet PCc1 behind a position located a predetermined number of packets before the data packet PDc1 (including the position located the predetermined number of packets before the data packet PDc1) among the control information multiplexing points. For example, the multiplexer 116 may multiplex the control information packet PCc1 in a position between the position that is three packets before the data packet PDc1 and the position that is one packet before the data packet PDc1 among the control information multiplexing points.

Further, in a case where the multiplexer 116 multiplexes the control information packet PCc1 after the data packet PDc1, the multiplexer 116 should multiplex the control information packet PCc1 in such a position that the reception device can receive the control information packet PCc1 before the timing to start reproduction of the data included in the data packet PDc1, among the control information multiplexing points.

It should be noted that the same control information packet may be multiplexed (transmitted) more than once, for example. In this case, the multiplexer 116 should perform multiplexing so that at least one of the above conditions is satisfied.

Also, in a case where the top of an MPU is not a random access point, the multiplexer 116 should multiplex the control information packet including the time information about the MPU so that the above conditions are satisfied.

Further, there may be a case where one MPU is divided and stored in different data packets, as described above. In this case, the multiplexer 116 should multiplex the control information packet including the time information about the MPU so that the above conditions are satisfied, for example, the reference packet being the data packet including a random access point among the data packets. It should be noted that, in a case where the MPU includes more than one random access point, the multiplexer 116 should multiplex the control information packet including the time information about the MPU so that the above conditions are satisfied, for example, the reference packet being the data packet including the first random access point among the data packets.

Also, there may be a case where the time information about one MPU is divided and stored in different control information packets (a control packet group), as described above. In this case, the multiplexer 116 should multiplex the control information packet group so that the above conditions are satisfied by the entire control information packet group.

For example, the multiplexer 116 should multiplex the entire control information packet group in a position between a position located a predetermined number of packets before the corresponding data packet and a position in which the reception device can receive the last packet of the control information packet group before the timing to start reproduction of the data included in the corresponding data packet, among the control information multiplexing points.

It should be noted that some other packets may be inserted in the middle of the control information packet group, but the intervals between the control information packets included in the control information packet group are preferably as short as possible. Also, part of the control information packet group may be multiplexed before the corresponding data packet, and the remaining part of the control information packet group may be multiplexed after the corresponding data packet, for example. That is, the corresponding data packet may be multiplexed in the middle of the control information packet group.

Also, the determination procedure in step S2 in FIG. 5 may be changed to "does the selected data packet include the top of an MPU?", for example. For example, in a case where a data packet has a different "mpu_sequence_number" from the previous one, the multiplexer 116 can regard the data packet with the different "mpu_sequence_number" as a data packet including the top of the MPU.

Therefore, in a case where the "mpu_sequence_number" of the selected data packet differs from the "mpu_sequence_number" of the previously multiplexed data packet in step S2, the multiplexer 116 determines that the selected data packet includes the top of an MPU, and the process then moves on to step S3. In a case where the "mpu_sequence_number" of the selected data packet is the same as the "mpu_sequence_number" of the previously multiplexed data packet in step S2, on the other hand, the multiplexer 116 determines that the selected data packet does not include the top of an MPU. Therefore, the procedure in step S3 is skipped, and the process moves on to step S4.

It should be noted that, in this case, the corresponding control information packet is multiplexed before the data packet including the random access point included in the MPU, regardless of whether the top of the MPU is a random access point.

2. Second Embodiment

Referring now to FIGS. 8 through 11, a second embodiment of the present technology is described.

[Example Configuration of a Recording Device 301]

Figure 8:
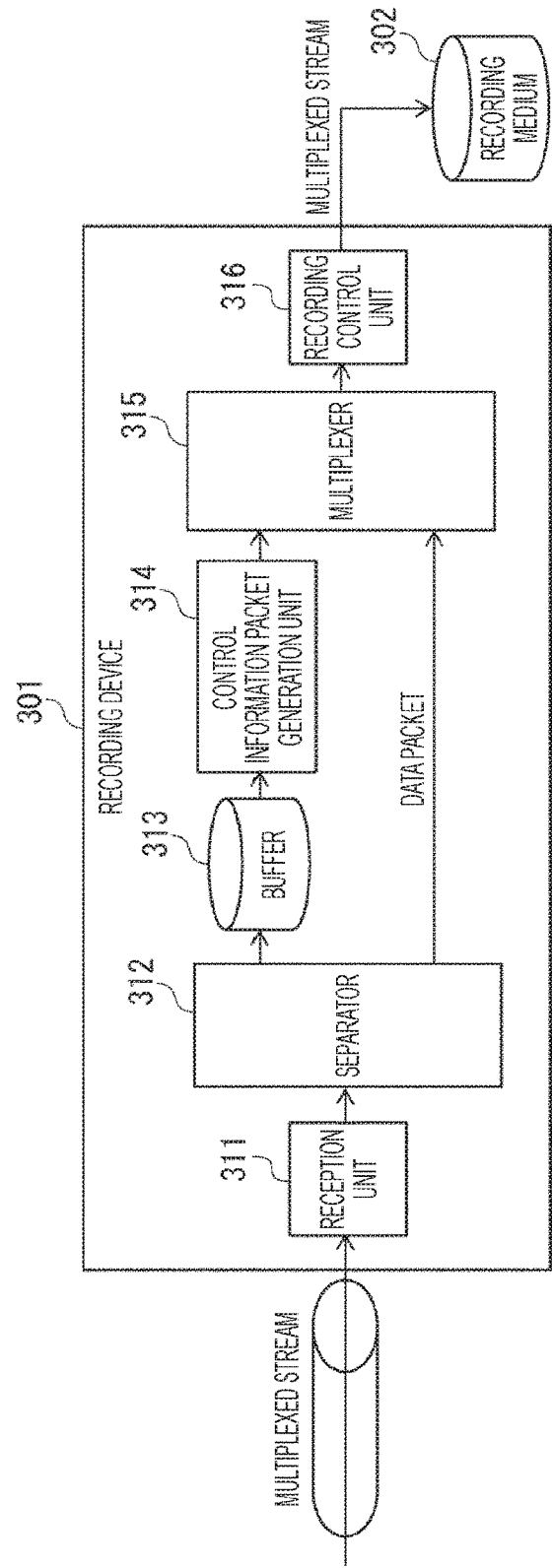
FIG. 8 is a block diagram showing an embodiment of a recording device to which the present technology is applied.

FIG. 8 is a block diagram showing an embodiment of a recording device 301 to which the present technology is applied.

The recording device 301 is a device that separates packets included in a multiplexed stream that is input from outside, re-multiplexes the separated packets, and records the re-multiplexed multiplexed stream on a recording medium 302. The recording device 301 includes a reception unit 311, a separator 312, a buffer 313, a control information packet generation unit 314, a multiplexer 315, and a recording control unit 316.

The reception unit 311 receives a multiplexed stream from outside, and supplies the received multiplexed stream to the separator 312.

The separator 312 separates packets such as data packets and control information packets and the like from the multiplexed stream, and extracts necessary packets. The separator 312 supplies the data packets among the extracted packets to the multiplexer 315. The separator 312 also extracts the control information included in the control information packets among the extracted packets, and stores the control information into the buffer 313.

The control information packet generation unit 314 packetizes the control information stored in the buffer 313, to generate control information packets. In doing so, the control information packet generation unit 314 also changes the control information as necessary. For example, the control information packet generation unit 314 changes the control information so as to include only the information about the data packets extracted by the separator 312. Also, in a case where a video signal or an audio signal is converted, for example, the control information packet generation unit 314 changes the control information so as to include information corresponding to the converted video signal or audio signal. The control information packet generation unit 314 supplies the generated control information packets to the multiplexer 315.

The multiplexer 315 generates a multiplexed stream by re-multiplexing the data packets supplied from the separator 312 and the control information packets supplied from the control information packet generation unit 314, and supplies the multiplexed stream to the recording control unit 316.

The recording control unit 316 controls recording of the multiplexed stream generated by the multiplexer 315 on the recording medium 302.

The recording medium 302 is formed with a removable medium such as a magnetic disk, an optical disk, a magnetooptical disk, or a semiconductor memory, or a hard disk, for example.

[Re-Multiplexing Process to be Performed by the Recording Device 301]

Figure 9:
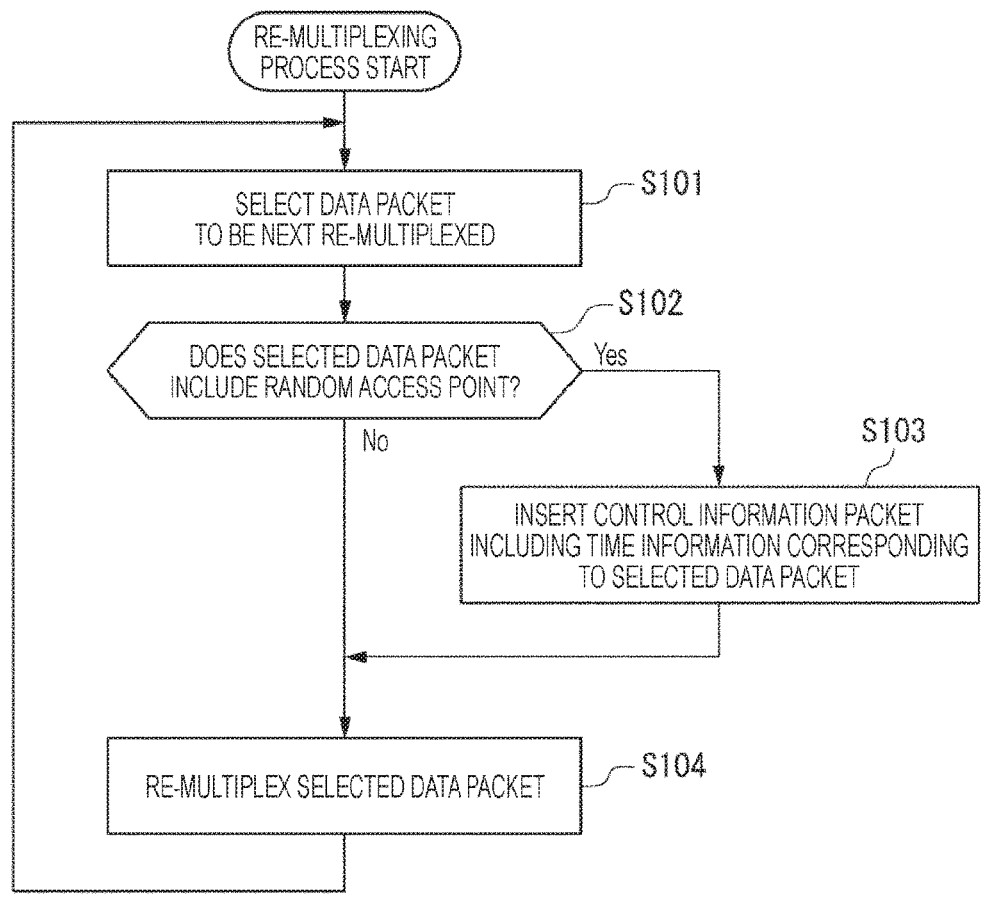
FIG. 9 is a flowchart for explaining a re-multiplexing process to be performed by the recording device.

Referring now to the flowchart in FIG. 9, a re-multiplexing process to be performed by the recording device 301 is described.

In step S101, the multiplexer 315 selects the data packet to be next re-multiplexed. Specifically, the multiplexer 315 selects the data packet to be next re-multiplexed into a multiplexed stream, from among the data packets supplied from the separator 312.

In step S102, the multiplexer 315 determines whether the selected data packet includes a random access point, as in the procedure in step S2 in FIG. 5. In a case where the selected data packet is determined to include a random access point, the process moves on to step S103.

In step S103, the multiplexer 315 inserts the control information packet including the time information corresponding to the selected data packet. Specifically, the multiplexer 315 searches the control information packets supplied from the control information packet generation unit 314, for the control information packet in which the same "packet_id" and "mpu_sequence_number" as those of the selected data packet are set in the MPT. The multiplexer 315 then supplies the detected control information packet to the recording control unit 316. The recording control unit 316 records the supplied control information packet on the recording medium 302. As a result, the control information packet including the time information corresponding to the selected data packet is multiplexed into the multiplexed stream, and is recorded on the recording medium 302.

After that, the process moves on to step S104.

In a case where the selected data packet is determined not to include a random access point in step S102, on the other hand, the procedure in step S103 is skipped, and the process moves on to step S104.

In step S104, the multiplexer 315 multiplexes the selected data packet. Specifically, the multiplexer 315 supplies the selected data packet to the recording control unit 316. The recording control unit 316 records the supplied data packet on the recording medium 302. As a result, the selected data packet is multiplexed into the multiplexed stream, and is recorded on the recording medium 302.

After that, the process returns to step S101, and the procedures in step S101 and the later steps are carried out.

Figure 10:
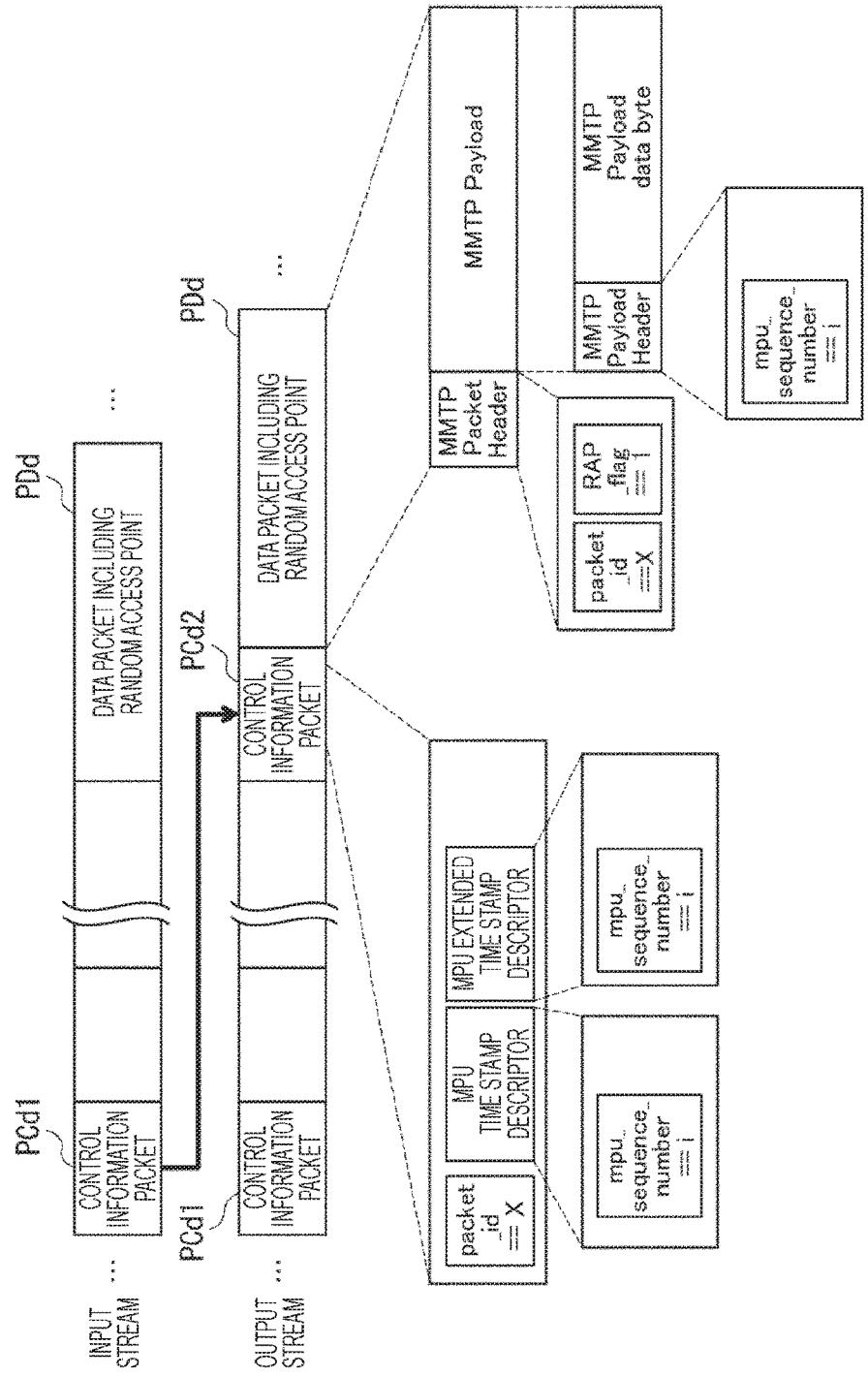
FIG. 10 is a diagram showing a first example of a position in which a control information packet is re-multiplexed.

FIG. 10 shows the relationship between a multiplexed stream received by the recording device 301 (this multiplexed stream will be hereinafter referred to as the input stream) and the multiplexed stream to be recorded on the recording medium 302 by the recording device 301 (this multiplexed stream will be hereinafter referred to as the output stream).

In the input stream in this example, there is an interval between a data packet PDd including a random access point and a control information packet PCd1 including the time information corresponding to the data packet PDd. In the output stream, on the other hand, a control information packet PCd2 based on the control information packet. PCd1 is multiplexed immediately before the data packet PDd. The time information included in the control information packet PCd2 of course includes the time information corresponding to the random access point included in the data packet PDd. It should be noted that the control information in the control information packet PCd2 is changed from the contents of the control information in the original control information PCd1, as necessary.

Through this process, the reproduction device that performs reproduction iron the recording medium 302 can appropriately reproduce a data stream recorded on the recording medium 302, without any special measures taken on the transmission device side. For example, in a case where the reproduction device performs reproduction starting from the data included in the data packet. PDd, the reproduction device performs reading starting from the control information packet PCd2 immediately before the data, to obtain the time information to be used in reproducing the data. As a result, the reproduction device does not need to discard unnecessarily read packets between the control information packet PCd2 and the data packet PDd, and can promptly start reproduction of the data included in the data packet PDd.

It should be noted that, although the original control information packet PCd1 is re-multiplexed into the output stream separately from the control information packet PCd2 in the example shown in FIG. 10, the control information packet PCd1 may not be re-multiplexed. Also, in a case where the control information packet PCd1 is re-multiplexed into the output stream, the contents of the control information are changed as necessary.

Further, in a case where data of more than one broadcast program, more than one video signal, or more than one audio signal is re-multiplexed, for example, a packet of another broadcast program, another video signal, or another audio signal may be inserted between the control information packet PCd2 and the data packet PDd in FIG. 10.

[Modifications of Positions in which a Control Information Packet is Re-Multiplexed]

Next, modifications of positions in which a control information packet is re-multiplexed are described.

For example, the control information packet PCd2 is not necessarily re-multiplexed before the data packet PDd, and may be re-multiplexed after the data packet PDd. In this case, to reduce the unnecessarily read packets to be discarded between the data packet PDd and the control information packet PCd2, it is preferable to re-multiplex the control information packet PCd2 immediately after the data packet PDd.

Figure 11:
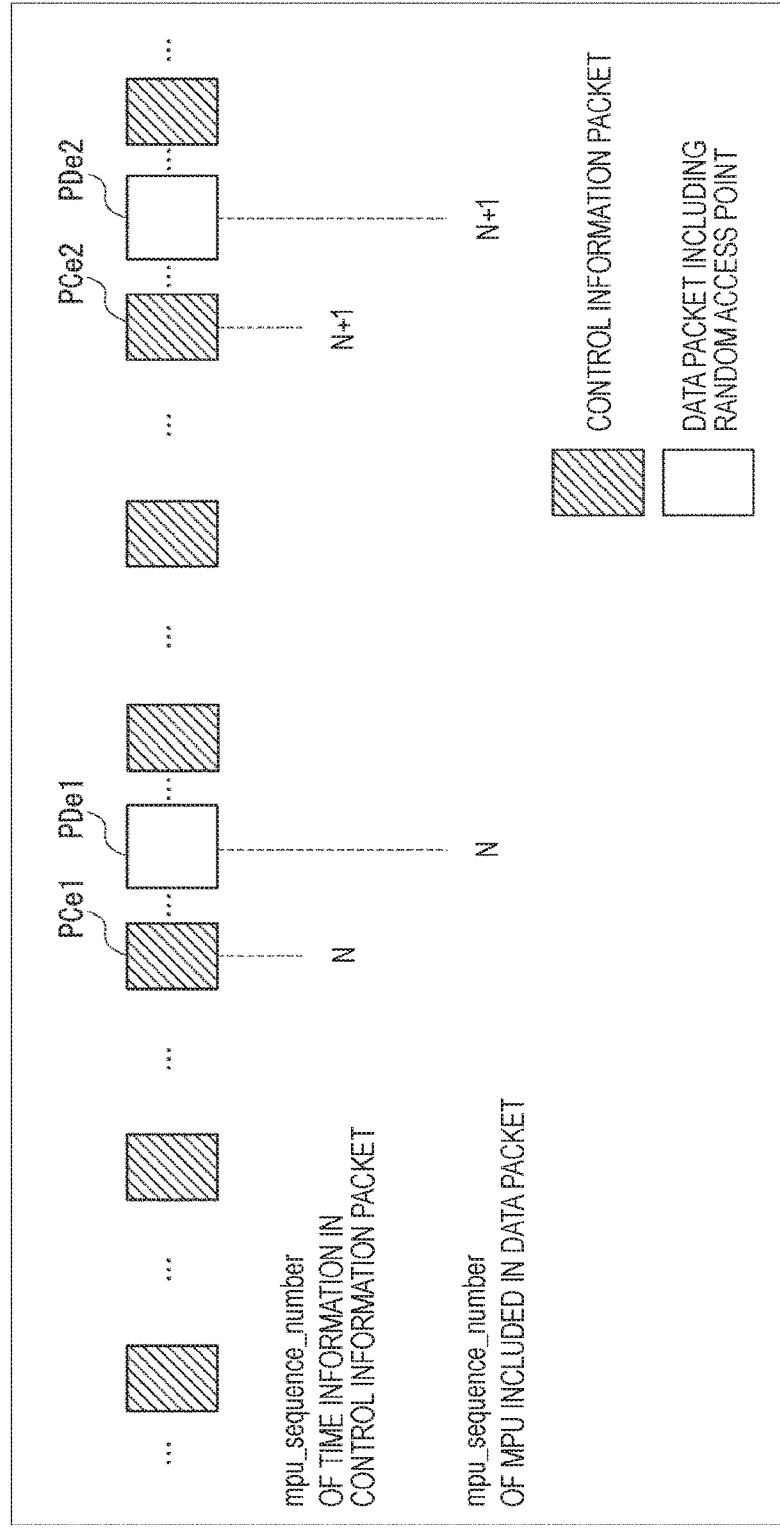
FIG. 11 is a diagram showing a second example of a position in which a control information packet is re-multiplexed.

Further, there are cases where a control information packet needs to be replaced with a particular packet, and be periodically re-multiplexed, for example, and the positions in which a control information packet can be re-multiplexed are determined in advance (these positions will be hereinafter referred to as the control information multiplexing points), as indicated by the shaded portions in FIG. 11. In this case, the multiplexer 315 cannot necessarily re-multiplex a control information packet PCe1 corresponding to a data packet PDe1 including a random access point, immediately before the data packet PDe1.

Therefore, in a case where the multiplexer 315 re-multiplexes the control information packet PCe1 before the data packet PDe1 in such a case, the multiplexer 315 should multiplex the control information packet PCe1 in the position closest to the data packet PDe1 among the control information multiplexing points. It should be noted that, in a case where there is a control information multiplexing point immediately before the data packet PDe1, the control information packet PCe1 is re-multiplexed immediately before the data packet. PDe1, as in the example shown in FIG. 10.

Likewise, in a case where the multiplexer 315 re-multiplexes a control information packet PCc2 corresponding to a data packet PDc2 including a random access point before the data packet PDc2, the multiplexer 315 should re-multiplex the control information packet PCc2 in the position closest to the data packet PDc2 among the control information multiplexing points.

Further, in a case where the multiplexer 315 re-multiplexes the control information packet PCe1 before the data packet. PDe1, the multiplexor 315 may re-multiplex the control information packet PCe1 behind a position located a predetermined number of packets before the data packet PDe1 (including the position located the predetermined number of packets before the data packet PDe1) among the control information multiplexing points. For example, the multiplexer 315 may re-multiplex the control information packet PCe1 in a position between the position that is three packets before the data packet PDe1 and the position that is one packet before the data packet PDe1 among the control information multiplexing points.

Further, in a case where the multiplexer 315 re-multiplexes the control information packet PCe1 after the data packet PDe1, the multiplexer 315 should re-multiplex the control information packet PCc1 in the position closest to the data packet PDe1 among the control information multiplexing points.

Also, in a case where the multiplexer 315 re-multiplexes the control information packet PCe1 after the data packet PDe1, the multiplexer 315 may re-multiplex the control information packet. PCe1 before a position located a predetermined number of packets behind the data packet PDe1 (including the position located the predetermined number of packets behind the data packet PDe1) among the control information multiplexing points.

For example, the multiplexer 315 may re-multiplex the control information packet PCe1 in a position between the position that is one packet behind the data packet PDe1 and the position that is three packets behind the data packet PDe1 among the control information multiplexing points.

Also, in a case where the top of an MPU is not a random access point, the multiplexer 315 should re-multiplex the control information packet including the time information about the MPU so that the above conditions are satisfied.

Further, there may be a case where one MPU is divided and stored in different data packets, as described above. In this case, the multiplexer 315 should re-multiplex the control information packet including the time information about the MPU so that the above conditions are satisfied, for example, the reference packet being the data packet including a random access point among the data packets. It should be noted that, in a case where the MPU includes more than one random access point, the multiplexer 315 should re-multiplex the control information packet including the time information about the MPU so that the above conditions are satisfied, for example, the reference packet being the data packet including the first random access point among the data packets.

Also, there may be a case where the time information about one MPU is divided and stored in different control information packets (a control packet group), as described above. In this case, the multiplexer 315 should re-multiplex the control information packet group so that the above conditions are satisfied by the entire control information packet group.

For example, the multiplexer 315 should re-multiplex the entire control information packet group in a position between a position located a predetermined number of packets before the corresponding data packet and a position located a predetermined number of packets behind the corresponding data packet, among the control information multiplexing points.

It should be noted that some other packets may be inserted in the middle of the control information packet group, but the intervals between the control information packets included in the control information packet group are preferably as short as possible. Also, part of the control information packet group may be re-multiplexed before the corresponding data packet, and the remaining part of the control information packet group may be re-multiplexed after the corresponding data packet, for example. That is, the corresponding data packet may be re-multiplexed in the middle of the control information packet group.

Also, the determination procedure in step S102 in FIG. 9 may be changed to "does the selected data packet include the top of an MPU?", for example, as in the above described determination process in step 82 in FIG. 5.

3. Third Embodiment

Figure 12:
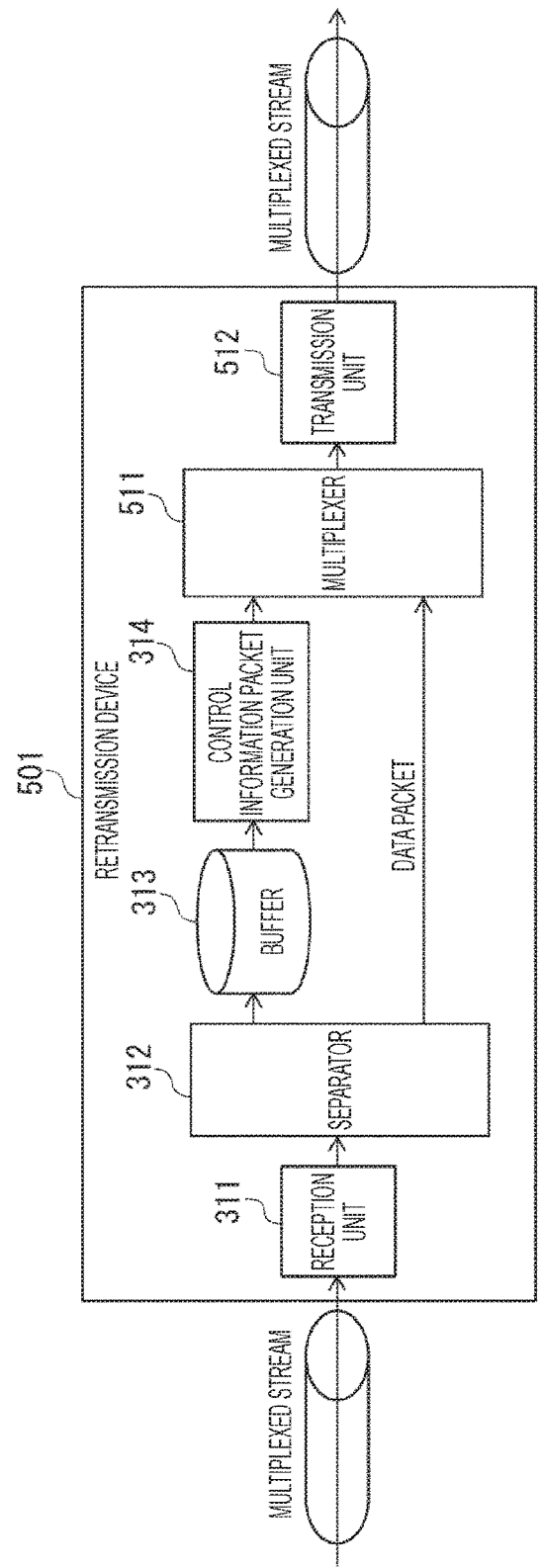
FIG. 12 is a block diagram showing an embodiment of a retransmission device to which the present technology is applied.

Referring now to FIG. 12, a third embodiment of the present technology is described.

[Example Configuration of a Retransmission Device 501]

FIG. 12 is a block diagram showing an embodiment of a retransmission device 501 to which the present technology is applied. It should be noted that, in the drawing, the components equivalent to those in FIG. 8 are denoted by the same reference numerals as those used in FIG. 8.

The retransmission device 501 is a device that separates the packets included in a multiplexed stream received from outside, re-multiplexes the separated packets, and transmits the multiplexed packets to outside. The retransmission device 501 is used in a device that transmits multiplexed streams that are broadcast signals received from a broadcast station to a cable television network, or in a device that transmits multiplexed streams that are broadcast signals received from a broadcast station to a mobile device such as a smartphone, for example.

The retransmission device 501 differs from the recording device 301 shown in. FIG. 8, in that the multiplexer 315 and the recording control unit 316 are replaced with a multiplexer 511 and a transmission unit 512.

The multiplexer 511 generates a multiplexed stream by re-multiplexing data packets supplied from the separator 312 and control information packets supplied from the control information packet generation unit 314, and supplies the multiplexed stream to the transmission unit 512. It should be noted that the multiplexer 511 re-multiplexes the control information packets under conditions similar to those for the multiplexer 116 of the transmission device 101 shown in FIG. 1.

The transmission unit 512 performs transmission of the multiplexed stream generated by the multiplexer 511.

As a result, the reception device that receives the multiplexed stream transmitted from the retransmission device 501 becomes able to reproduce the data included in each data packet included in the multiplexed stream at appropriate timing, as in the case of the transmission device 101. Further, the reception device does not need to discard unnecessarily read packets between a control information packet and the corresponding data packet, and can promptly start reproduction of the data included in the data packet.

4. Modifications

The following is a description of modifications of the above described embodiments of the present technology.

In the above described embodiments, a multiplexed stream is a stream formed by multiplexing MMTP Packets.

However, the present technology can also be applied in a case where data packets and control information packets are further packetized by the Internet protocols or the like and are then multiplexed, for example.

The present technology can also be applied in a case where the above described current, data to be reproduced other than video signals and audio signals (this data will be hereinafter referred to as the reproduction data) is packetized and is then multiplexed. Such reproduction data may be subtitles data, for example.

Further, the present technology can be applied in a case where time information including only either a decoding time or a presentation time, or time information other than a decoding time and a presentation time is packetized and multiplexed separately from reproduction data.

The present technology can also be applied in a case where timing information that is neither a decoding time nor a presentation time but is to be used in controlling the timing to reproduce reproduction data is packetized and multiplexed separately from the reproduction data. For example, such timing information may be a reproduction time or the like that is the time for the reception side to start reproducing reproduction data that has not been decoded on the transmission side.

Further, depending on the type of reproduction data, a point at which reproduction within a predetermined processing unit can be started, instead of a random access point, may be used in the above described process, for example. Such a point is defined in a different manner from a random access point.

The present technology can also be applied in a case where control information that is not timing information but is necessary in reproducing reproduction data is packetized and multiplexed separately from the reproduction data.

Further, the present technology can be applied to any systems and devices that process a data stream generated by packetizing and multiplexing reproduction data as the current data to be reproduced, separately from the control information to be used in reproducing the reproduction data.

[Example Configuration of a Computer]

The above described series of processes can be performed by hardware, or can be performed by software. In a case where the series of processes are to be performed by software, the program that forms the software is installed into a computer. Here, the computer may be a computer incorporated into special-purpose hardware, or may be a general-purpose personal computer that can execute various kinds of functions, having various kinds of programs installed thereinto.

Figure 13:
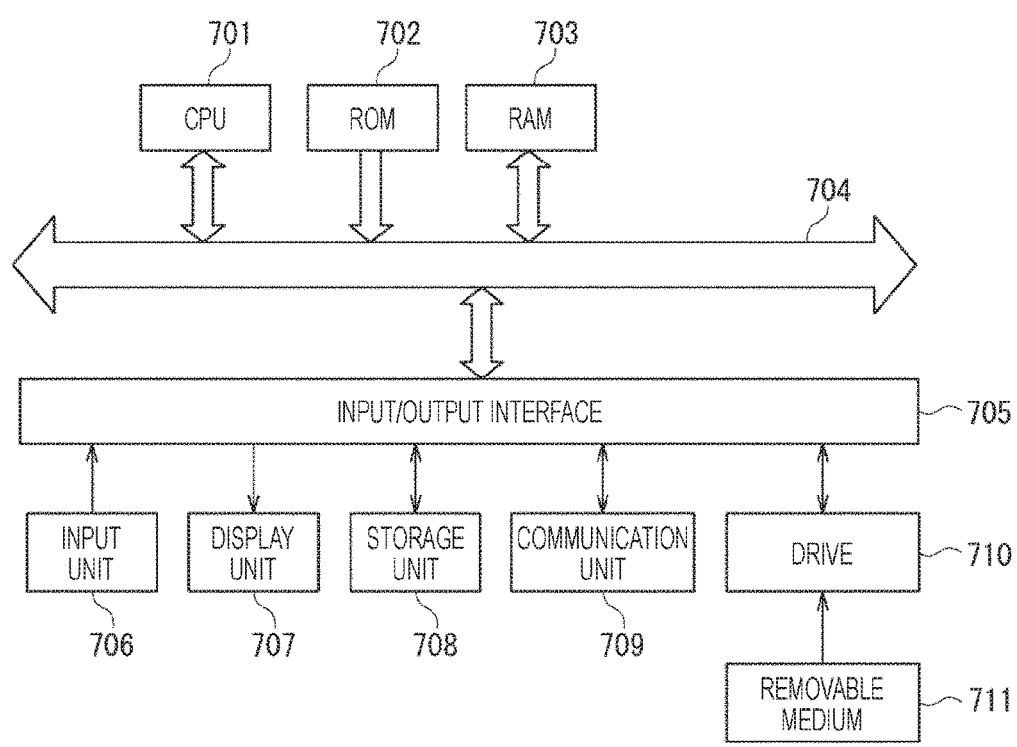
FIG. 13 is a block diagram showing an example configuration of a computer.

FIG. 13 is a block diagram showing an example configuration of the hardware of a computer that performs the above described series of processes in accordance with a program.

In the computer, a CPU (Central Processing Unit) 701, a ROM (Read Only Memory) 702, and a RAM (Random Access Memory) 703 are connected to one another by a bus 704.

An input/output interface 705 is further connected to the bus 704. An input unit 706, an output unit 707, a storage unit 708, a communication unit 709, and a drive 710 are connected to the input/output interface 705.

The input unit 706 is formed with a keyboard, a mouse, a microphone, and the like. The output unit 707 is formed with a display, a speaker, and the like. The storage unit 708 is formed with a hard disk, a nonvolatile memory, or the like. The communication unit 709 is formed with a network interface or the like. The drive 710 drives a removable medium 711 that is a magnetic disk, an optical disk, a magneto optical disk, a semiconductor memory, or the like.

In the computer having the above described configuration, the CPU 701 loads a program stored in the storage unit 708 into the RAM 703 via the input/output interface 705 and the bus 704, for example, and executes the program, so that the above described series of processes are performed.

The program to be executed by the computer (the CPU 701) may be recorded on the removable medium 711 as a packaged medium to be provided, for example. Alternatively, the program can be provided via a wired or wireless transmission medium, such as a local area network, the Internet, or digital satellite broadcasting.

In the computer, the program can be installed into the storage unit 708 via the input/output interface 705 when the removable medium 711 is mounted on the drive 710. The program can also be received by the communication unit 709 via a wired or wireless transmission medium, and be installed into the storage unit 708. Also, the program may be installed beforehand into the ROM 702 or the storage unit 708.

It should be noted that the program to be executed by a computer may be a program for performing processes in chronological order in accordance with the sequence described in the present specification, or may be a program for performing processes in parallel or performing a process when necessary, such as when there is a call.

Also, in this specification, a system means an assembly of components (devices, modules (parts), and the like), and not all the components need to be provided in the same housing. In view of this, devices that are housed in different housings and are connected to one another via a network form a system, and one device having modules housed in one housing is also a system.

Further, it should be noted that embodiments of the present technology are not limited to the above described embodiments, and various modifications may be made to them without departing from the scope of the present technology.

For example, the present technology can be embodied in a cloud computing configuration in which one function is shared among devices via a network, and processing is performed by the devices cooperating with one another.

Also, the respective steps described with reference to the above described flowcharts can be carried out by one device or can be shared among devices.

Further, in a case where more than one process is included in one step, the processes included in the step can be performed by one device or can be shared among devices.

In addition, the advantageous effects described in this specification are merely examples, and the advantageous effects of the present technology are not limited to them and may include other effects.

Further, it should be noted that embodiments of the present technology are not limited to the above described embodiments, and various modifications may be made to them without departing from the scope of the present technology.

The present technology can also be in the following forms, for example.

(1) A data processing device including
a multiplexer that generates a first data stream by multiplexing a data packet and a control information packet separately from each other, the data packet being a packet including reproduction data as the current data to be reproduced, the control information packet being a packet including control information to be used in reproducing the reproduction data,
in which the multiplexer multiplexes a first packet in a position behind the position located a predetermined first number of packets before a second packet among multiplexing-enabled positions in which the control information packet can be multiplexed in the first data stream, the first packet being the control information packet including the control information corresponding to a predetermined processing unit of the reproduction data, the second packet being the data packet including the processing unit.

(2) The data processing device of (1), in which the multiplexer multiplexes the first packet in a position closest to the second packet among the multiplexing-enabled positions, the position closest to the second packet being located before the second packet.

(3) The data processing device of (1) or (2), further including
a transmission unit that transmits the first data stream,
in which, in a case where the first packet is to be multiplexed after the second packet, the multiplexer multiplexes the first packet in a position where a device that receives the first data stream can receive the first packet before the timing to start reproducing the reproduction data included in the second packet.

(4) The data processing device of (3), further including:
a data packet generation unit that generates the data packet; and
a control information packet generation unit that generates the control information packet,
in which the multiplexer multiplexes the data packet generated by the data packet generation unit and the control information packet generated by the control information packet generation unit.

(5) The data processing device of (3), further including
a separator that separates the data packet and the control information packet from a second data stream,
in which the multiplexer generates the first data stream by re-multiplexing the data packet and the control information packet separated.

(6) The data processing device of (1) or (2), further including
a recording control unit that controls recording of the first data stream on a recording medium,
in which, in a case where the first packet is to be multiplexed after the second packet, the multiplexer multiplexes the first packet in a position before the position located a predetermined second number of packets behind the second packet, among the multiplexing-enabled positions.

(7) The data processing device of (6), in which the multiplexer multiplexes the first packet in a position closest to the second packet among the multiplexing-enabled positions, the position closest to the second packet being located behind the second packet.

(8) The data processing device of (6) or (7), further including
a separator that separates the data packet and the control information packet from a second data stream,
in which the multiplexer generates the first data stream by re-multiplexing the data packet and the control information packet separated.

(9) The data processing device of any of (1) to (8), in which the second packet includes at least one of a reproduction starting point at which reproduction can be started in the processing unit, and the top of the processing unit.

(10) The data processing device of (9), in which
the reproduction data is a video signal, and
the reproduction starting point is a random access point.

(11) The data processing device of (9) or (10), in which the control information includes timing information to be used in controlling the timing to reproduce the reproduction starting point of the processing unit.

(12) The data processing device of (11), in which the timing information includes at least one of a piece of information indicating the time to start decoding of the reproduction starting point, and a piece of information indicating the time to present the reproduction starting point.

(13) The data processing device of any of (1) to (12), in which
the data packet and the control information packet are MMT Protocol (MMTP) Packets, and
the processing unit is a Media Processing Unit (MPU).

(14) A data processing method implemented in a data processing device that generates a data stream by multiplexing a data packet and a control information packet separately from each other, the data packet being a packet including reproduction data as the current data to be reproduced, the control information packet being a packet including control information to be used in reproducing the reproduction data,
the data processing method including
a multiplexing step of multiplexing a first packet in a position behind the position located a predetermined first number of packets before a second packet among multiplexing-enabled positions in which the control information packet can be multiplexed in the data stream, the first packet being the control information packet including the control information corresponding to a predetermined processing unit of the reproduction data, the second packet being the data packet including the processing unit,
the multiplexing step being carried out by the data processing device.

(15) A program to be executed in a computer that generates a data stream by multiplexing a data packet and a control information packet separately from each other, the data packet being a packet including reproduction data as the current data to be reproduced, the control information packet being a packet including control information to be used in reproducing the reproduction data,
the program causing the computer to perform a process including
a multiplexing step of multiplexing a first packet in a position behind the position located a predetermined first number of packets before a second packet among multiplexing-enabled positions in which the control information packet can be multiplexed in the data stream, the first packet being the control information packet including the control information corresponding to a predetermined processing unit of the reproduction data, the second packet being the data packet including the processing unit.

REFERENCE SIGNS LIST

101 Transmission device
114 Data packet generation unit
115 Control information packet generation unit
116 Multiplexer
117 Transmission unit
301 Recording device
302 Recording medium
311 Reception unit
312 Separation unit
315 Multiplexer
316 Recording control unit
501 Retransmission device
511 Multiplexer
512 Transmission unit

The invention claimed is:

1. A data processing device comprising
a multiplexer configured to generate a first data stream by multiplexing a data packet and a control information packet separately from each other, the data packet being a packet including reproduction data as current data to be reproduced, the control information packet being a packet including control information to be used in reproducing the reproduction data; and
a transmission unit configured to transmit the first data stream,
wherein the multiplexer is configured to multiplex a first packet in a first position behind a second position located a predetermined first number of packets before a second packet among multiplexing-enabled positions in which the control information packet can be multiplexed in the first data stream, the first packet being the control information packet including the control information corresponding to a predetermined processing unit of the reproduction data, the second packet being the data packet including a processing unit,
wherein, in a case where the first packet is to be multiplexed after the second packet, the multiplexer is further configured to multiplex the first packet in a third position where a device that receives the first data stream also receives the first packet before timing to start reproducing the reproduction data included in the second packet.

2. The data processing device according to claim 1, wherein the multiplexer is further configured to multiplex the first packet in a position closest to the second packet among the multiplexing-enabled positions, the position closest to the second packet being located before the second packet.

3. The data processing device according to claim 1, further comprising:
a data packet generation circuitry configured to generate the data packet; and
a control information packet generation circuitry configured to generate the control information packet,
wherein the multiplexer is configured to multiplex the data packet generated by the data packet generation circuitry and the control information packet generated by the control information packet generation circuitry.

4. The data processing device according to claim 1, further comprising:
a separator circuitry configured to separate the data packet and the control information packet from a second data stream,
wherein the multiplexer is configured to generate the first data stream by re-multiplexing the data packet and the control information packet that are separated by the separator circuitry.

5. The data processing device according to claim 1, further comprising:
a recording control unit configured to control recording of the first data stream on a recording medium,
wherein, in the case where the first packet is to be multiplexed after the second packet, the multiplexer is configured to multiplex the first packet in a fourth position before a fifth position located a predetermined second number of packets behind the second packet, among the multiplexing-enabled positions.

6. The data processing device according to claim 5, wherein the multiplexer is configured to multiplex the first packet in a position closest to the second packet among the multiplexing-enabled positions, the position closest to the second packet being located behind the second packet.

7. The data processing device according to claim 5, further comprising:
a separator circuitry configured to separate the data packet and the control information packet from a second data stream,
wherein the multiplexer is further configured to generate the first data stream by re-multiplexing the data packet and the control information packet that are separated.

8. The data processing device according to claim 1, wherein the second packet includes at least one of a reproduction starting point at which reproduction can be started in the processing unit.

9. The data processing device according to claim 8, wherein
the reproduction data is a video signal, and
the reproduction starting point is a random access point.

10. The data processing device according to claim 8, wherein the control information includes timing information to be used in controlling timing to reproduce the reproduction starting point of the processing unit.

11. The data processing device according to claim 10, wherein the timing information includes at least one of a first piece of information indicating a time to start decoding of the reproduction starting point, and a second piece of information indicating a time to present the reproduction starting point.

12. The data processing device according to claim 1, wherein
the data packet and the control information packet are MMT Protocol (MMTP) Packets, and
the processing unit is a Media Processing Unit (MPU).

13. A data processing method comprising:
receiving, with a data processing device, a data packet;
receiving, with the data processing device, a control information packet;
multiplexing, with the data processing device, the data packet and the control information packet separately from each other to generate a data stream, the data packet being a packet including reproduction data as current data to be reproduced, the control information packet being a packet including control information to be used in reproducing the reproduction data,
wherein multiplexing further includes multiplexing a first packet in a position after a second packet where a device that receives the data stream can receive the first packet before timing to start reproducing the reproduction data included in the second packet, the first packet being the control information packet including the control information corresponding to a predetermined processing unit of the reproduction data, and the second packet being the data packet including a processing unit; and transmitting, with the data processing device, the data stream.

14. A non-transitory computer-readable medium comprising a program that, when executed by a computer, causes the computer to perform a set of operations comprising:

receiving a data packet;

receiving a control information packet;

multiplexing the data packet and the control information packet separately from each other to generate a data stream, the data packet being a packet including reproduction data as current data to be reproduced, the control information packet being a packet including control information to be used in reproducing the reproduction data, wherein multiplexing further includes multiplexing a first packet in a position after a second packet where a device that receives the data stream also receives the first packet before timing to start reproducing the reproduction data included in the second packet, the first packet being the control information packet including the control information corresponding to a predetermined processing unit of the reproduction data, and the second packet being the data packet including a processing unit; and transmitting the data stream.

15. The data processing method according to claim 13, wherein the second packet includes at least one of a reproduction starting point at which reproduction can be started in the processing unit.

16. The data processing method according to claim 15, wherein the reproduction data is a video signal, and the reproduction starting point is a random access point.

17. The data processing method according to claim 15, wherein the control information includes timing information to be used in controlling timing to reproduce the reproduction starting point of the processing unit.

18. The data processing method according to claim 17, wherein the timing information includes at least one of a first piece of information indicating a time to start decoding of the reproduction starting point, and a second piece of information indicating a time to present the reproduction starting point.

19. The data processing method according to claim 13, wherein the data packet and the control information packet are MMT Protocol (MMTP) Packets, and the processing unit is a Media Processing Unit (MPU).

20. The non-transitory computer-readable medium according to claim 14, wherein the data packet and the control information packet are MMT Protocol (MMTP) Packets, and the processing unit is a Media Processing Unit (MPU).

* * * * *